(12) United States Patent
Parry et al.

(10) Patent No.: US 8,682,978 B2
(45) Date of Patent: *Mar. 25, 2014

(54) METHODS AND SYSTEMS FOR PROVIDING EMAIL MESSAGES TO A PRINTING DEVICE

(75) Inventors: Travis J. Parry, Boise, ID (US); Brett A. Green, Meridian, ID (US); Robert Sesek, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3561 days.

This patent is subject to a terminal disclaimer.

(21) Appl. No.: 10/615,764

(22) Filed: Jul. 9, 2003

(65) Prior Publication Data

US 2005/0010642 A1   Jan. 13, 2005

(51) Int. Cl.
   *G06F 15/16*   (2006.01)
(52) U.S. Cl.
   USPC .......................................... 709/206; 709/220
(58) Field of Classification Search
   USPC ........................... 709/206, 220, 245; 705/14
   See application file for complete search history.

(56) References Cited

U.S. PATENT DOCUMENTS

| | | | | |
|---|---|---|---|---|
| 5,805,810 | A * | 9/1998 | Maxwell | 709/206 |
| 6,622,266 | B1 * | 9/2003 | Goddard et al. | 714/44 |
| 6,735,399 | B2 * | 5/2004 | Tabb et al. | 399/8 |
| 6,831,755 | B1 * | 12/2004 | Narushima et al. | 358/1.9 |
| 2002/0075500 | A1 * | 6/2002 | Kurz et al. | 358/1.14 |
| 2002/0116480 | A1 * | 8/2002 | Muto | 709/220 |
| 2002/0143617 | A1 * | 10/2002 | Borg et al. | 705/14 |
| 2002/0188504 | A1 * | 12/2002 | Whale | 705/14 |
| 2003/0002074 | A1 * | 1/2003 | Miyano | 358/1.15 |
| 2003/0107762 | A1 * | 6/2003 | Kinoshita et al. | 358/1.15 |
| 2003/0147095 | A1 * | 8/2003 | Karn | 358/1.15 |
| 2003/0182378 | A1 * | 9/2003 | Treptow et al. | 709/206 |
| 2003/0214546 | A1 * | 11/2003 | Hatasa et al. | 347/19 |
| 2005/0063714 | A1 * | 3/2005 | Kinoshita et al. | 399/27 |
| 2005/0240518 | A1 * | 10/2005 | Ishizuka | 705/39 |
| 2007/0136214 | A1 * | 6/2007 | Eskandari | 705/408 |

\* cited by examiner

*Primary Examiner* — Gerald Smarth

(57) ABSTRACT

A method of providing email messages for a printing device includes attaching a memory module storing the email messages to a printing device consumable.

22 Claims, 5 Drawing Sheets

METHODS AND SYSTEMS FOR PROVIDING EMAIL MESSAGES TO A PRINTING DEVICE

BACKGROUND

With a personal computer and an appropriate software package, a user can produce virtually any type of document that may be desired. For example, word processing software is used to produce text documents. Graphic design or computer-aided design software can be used to produce diagrams, charts, graphs, designs, etc. Spreadsheet software allows a user to manage large amounts of financial and other types of information. Database software similarly allows a user to manage various databases of information such as, client contact information, address and phone number information or "to do" items.

Frequently, it is desirable to generate a hardcopy of a document or data set that is produced or stored on a personal computer. A hardcopy may be desired, for example, for record keeping purposes or to share with another party. Consequently, a wide variety of printers and printing devices have been developed that can receive a print job from a host computer and produce a hardcopy of the document or data represented by that print job. In order to save space, particularly in home offices, many users employ a multi-function peripheral (MFP) with a host computer. A multi-function peripheral is a device that combines some form of printer with one or more of the following: a scanner, a copier, or a facsimile machine.

As used herein and in the appended claims, the terms "printer" and "printing device" are defined to mean any device that produces a hardcopy from electronic data, including, but not limited to, laser printers, inkjet printers, dot matrix printers, plotters, facsimile machines, digital copiers, photocopiers, multi-function peripherals, and the like. A printer or printing device may produce images on a variety of print media that are in color or are monochromatic.

The term "print job" is defined as data that has been specifically formatted for submission to a particular printer from which the printer can generate a hardcopy representing an underlying data set from which the print job was created. Most personal computers include programming that will be referred to generally as a "printer driver." A printer driver is a piece of software or firmware that receives data or a document to be printed from an application running on the computer. The printer driver formats the data for use by a corresponding printer, i.e., creates a print job, and then transmits the print job to the printer. Using the print job, the printer can produce a hardcopy of the underlying data or document.

In order to produce hardcopy documents, a printer or printing device uses supplies of materials that are "consumed" as documents are printed. Such consumables include, for example, toner and print media. As used herein and in the appended claims, "toner" shall be broadly defined to include any material that is selectively distributed by a printer or printing device on a print medium to form an image. Thus, "toner" includes, but is not limited to, ink, toner, colorant, printing fluid, etc. "Print media" or a "print medium" shall be broadly defined as any medium on which a printer or printing device prints an image. For example, types of "print media" include, but are not limited to, paper, cardboard, card stock, transparencies, vinyl, etc.

As used herein and the appended claims, the term "consumable" shall be defined to mean any material consumed by a printing device to produce hardcopy documents. For example, a consumable may be toner and the disposable cartridge or container that contains the toner in the printing device. A consumable may also be a stack or supply of print media. In addition to toner and print media, a "consumable" may be any part or portion of a printer or printing device that is periodically replaced to allow the printer or printing device to continue producing printed hardcopy documents.

Clearly, some effort is required to monitor a printer or printing device and replace or re-supply a consumable as needed. Some printers and printing devices may have some mechanism for alerting an operator that replacement of a consumable is required or that other attention must be given to the printer, e.g., due to a paper jam, etc. These mechanisms may include indicator lamps on the printer, messages displayed on a display device of the printer and audible alert sounds made by the printer. In some instances, the printer may be able to send a message to a printer driver running on a connected host computer indicating that a consumable needs replacement or the printer otherwise requires user attention.

SUMMARY

A method and system of providing email messages to a printing device includes attaching a memory module storing the email messages to a printing device consumable.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

This specification describes a method and device for installing email messages on a printer or printing device. These email messages may then be used by the printing device when transmitting notifications by email to a user or an attendant to conditions at the printing device or indicating that the printing device requires attention. Such a message may, for example, alert the user or attendant to clear a paper jam, or indicate that the printer is in need of replacement or a re-supply of a consumable such as an ink or toner cartridge, paper or other print medium, replaceable parts, etc. The described method includes storing one or more email messages on a memory module attached to a printing device consumable and uploading the email messages or an email message interface to the printing device for storage in memory and/or for execution when the consumable is loaded into the printing device.

Figure 1:
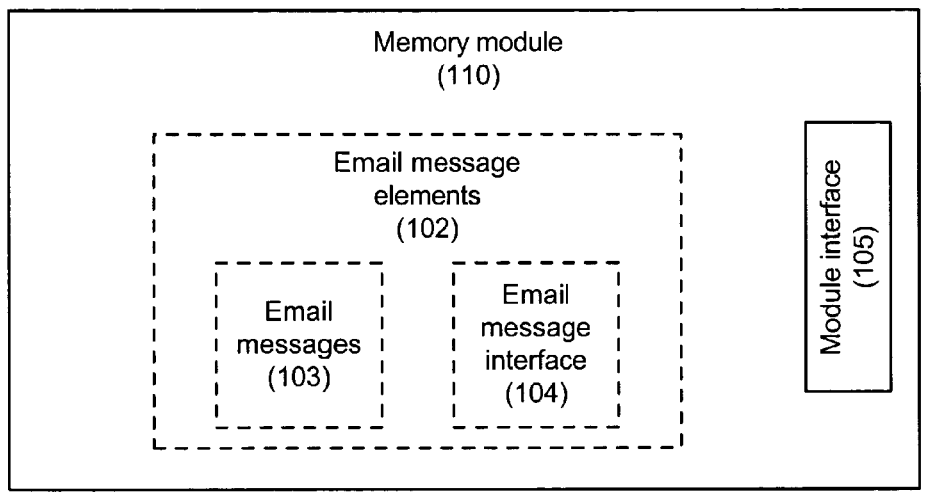
FIG. 1 is a block diagram illustrating email message elements stored on a memory module according to one embodiment of the present invention.

As shown in FIG. 1, email message elements (102) are stored on a memory module (110). The module (110) is a non-volatile memory device, for example, Flash memory, and includes a module interface (105) through which the data stored on the module (110), including the email message elements (102), can be accessed. The module interface (105) can be a wired or wireless interface. As will be described below, the module interface (105) interfaces the memory module (110) with a printing device so that the printing device can upload or use the email messages (103), email message interface (104), and other data items on the memory module (110).

In general, an email message (e.g., 103) includes a text portion containing information to be disclosed to the recipient. The email messages may be messages that alert the recipient to any of a number of possible conditions in the printing device that require user attention, such as low toner, a printer jam, etc. Any number of email messages (103) may be stored on the memory module (110).

The email messages (103) can be uploaded for use from the memory module (110) to the memory of a printing device. Alternatively, the email message interface (104) can be uploaded by a printer or printing device and used to access the email messages (103) that remain on the memory module (110). The email message interface (104) is stored as computer-readable instructions that can be uploaded and executed by a host printer or printing device. The email message interface (104) may be written according to customer specifications. The email message interface (104) may be programmed in a variety of computer languages, e.g., Java, C++, COM, etc.

Upon installation, the email messages (103) and email message interface (104), in conjunction with an operable email engine (135, FIG. 3), enable a computer or other processing device, such as a printer or printing device, to send email messages (103) to specified email addresses though a network to which the processing device is connected. The network may be a local area network (LAN), a wide area network (WAN) and/or the Internet.

As used herein and in the claims, the phrase "email engine" refers to a set of computer-readable instructions (e.g., software or firmware) for providing a printer or printing device with the function or capability of sending data or information via email. In some embodiments, the email engine (135, FIG. 3) will transmit an email message (103) corresponding to the appropriate alert message, e.g., "low toner," "paper jam," "service needed," etc., to one or more recipients.

Figure 2:
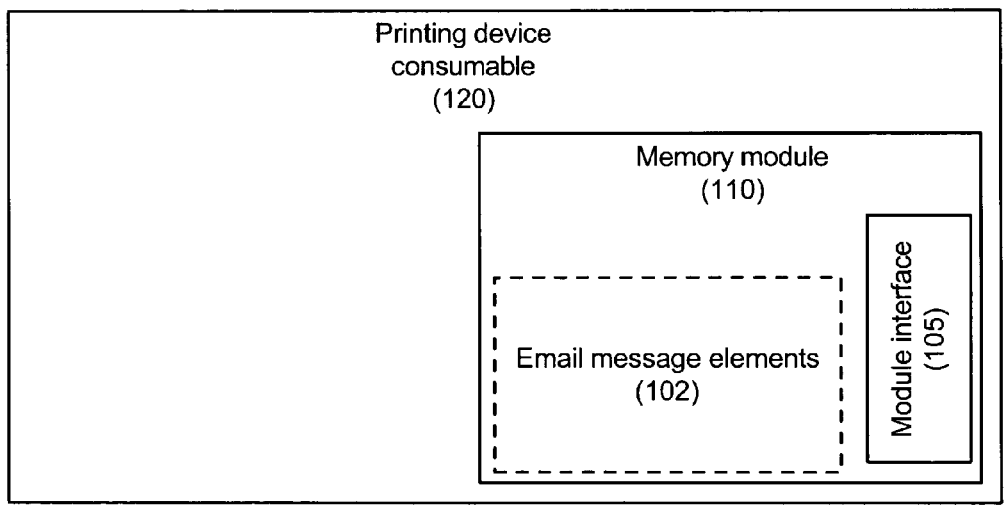
FIG. 2 is a block diagram illustrating a printing device consumable with an affixed memory module according to one embodiment of the present invention.

As shown in FIG. 2, the memory module (110) is attached to a printing device consumable (120) that will be provided to, or placed in, a printer or printing device. As indicated above, a "consumable" is any material, including toner or print media, consumed by a printing device to produce hardcopy documents. In addition to toner and print media, a "consumable" may be any part or portion of a printer or printing device that is periodically replaced to allow the printer or printing device to continue producing printed hardcopy documents. The memory module (110) may, for example, be attached to the disposable cartridge or container that holds the toner in the printing device. The memory module (110) may also be attached to the stack or supply of print media or to some other consumable part of the printing device.

The module interface (105) then provides communication between the printing device and the memory module (110) so that the printing device can upload or use the email messages (103), the email message interface (104), and any other data items on the memory module (110). The printing device may upload the email messages (103) and other data items on the memory module (110) to a memory unit in the printing device or, alternatively, the printing device may load and execute the email message interface (104) and use the other data items, e.g., email messages (103), directly from the memory module (110).

As indicated, the module interface (105) may be a wired or wireless interface for transferring data between the memory module (110) and a printing device. For example, the module interface (105) may comprise input/output lines or pins for allowing wired transmission and reception of data between the memory module (110) and a host printing device. Alternatively, the module interface (105) may also include an infrared transceiver to send and receive data wirelessly with an infrared signal. In still another example, the module interface (105) may include an antenna coil to send and receive data wirelessly using, for example, a radio frequency (RF) signal. For example, a Radio Frequency Identification (RFID) method and protocol may be used to transmit data between a memory module (110) and a printing device. Using a wireless method, as described herein, is advantageous because no physical contact between the memory module (110) and printing device is required.

Figure 3:
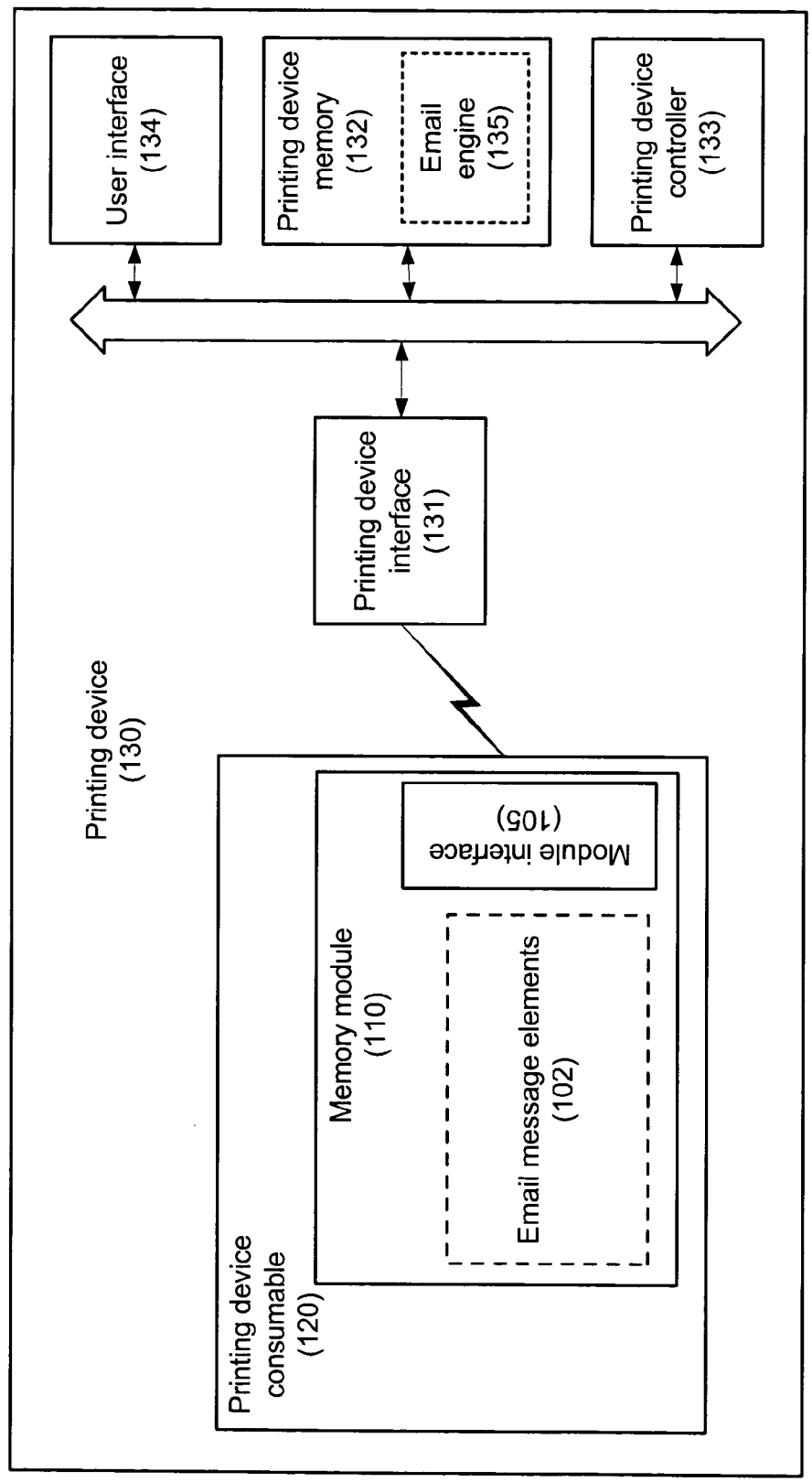
FIG. 3 is a block diagram of the consumable and memory module of FIG. 2 in use by a printing device according to one embodiment of the present invention.

FIG. 3 is a block diagram illustrating a consumable (120) that has been installed in, or supplied to, a printer or printing device (130). The consumable (120) bears a memory module (110) storing email message elements (102) for use by the printing device (130) as described above.

As shown in FIG. 3, the printing device (130) includes a printing device interface (131) that interfaces with the module interface (105) on the memory module (110). The printing device interface (131) will correspond to the module interface (105) to allow communication between the memory module (110) and the printing device (130). Consequently, the printing device interface (131) may be a receptacle for receiving the pins or wired traces of a wired module interface (105). Alternatively, the printing device interface (131) may be a wireless transceiver for communicating with a wireless transceiver of the module interface (105). In one embodiment, the memory module (110) may comprise an RFID memory tag as part of the module interface (105), and the printing device interface (131) may comprise an RFID interrogator. Alternatively, the module interface (105) and printing device interface (131) may, for example, be an infrared interface. The printing device interface (131) and the module interface (105) will be referred to collectively as the interface (105, 131).

The printing device (131) can upload the email message elements (102) and any other data items on the memory module (110) through the interface (105, 131). The email message elements (102) and any other uploaded data items may be stored in the memory unit (132) of the printing device (130). This printing device memory (132) may comprise both volatile and non-volatile memory, both writable and read-only memory. If the email message elements (102) are uploaded to the memory unit (132), those email message elements (102) may be stored in non-volatile memory so as to be available each time the printing device (130) is powered up.

Alternatively, the interface (105, 131) can allow the printing device (130) to execute or use the email message elements (102) and other data items directly from the memory module (110) without uploading or storing all the email elements (102) in the printing device memory unit (132). This is done by uploading the email message interface (104, FIG. 1) from the memory module (110) and using the email message interface (104, FIG. 1) to allow use of the email messages (103, FIG. 1) from the memory module (110). In such an embodiment, the email message interface (104) may be uploaded to volatile or non-volatile memory in the printing device memory unit (132). However, if the email message interface (104) is kept only in volatile memory, the email message interface (104) may be uploaded each time the printing device (130) is powered up. This will reduce the demands on non-volatile memory.

A printing device controller or processor (133) controls the operation of the printing device (130) according to firmware stored in the printing device memory (132). The printing device controller (133) will determine what portions of the email message elements (102) to upload for storage in the memory unit (132). For example, the controller (133) will determine whether to upload the email messages (103, FIG. 1) for storage in the printing device memory unit (132). Alternatively, the controller (133) may upload only the email message interface (104, FIG. 1), which will allow the email engine (135) of the printing device (130) to access and use the email messages (103, FIG. 1) that remain stored on the memory module (110, FIG. 1).

As indicated, if the email messages (103, FIG. 1) are uploaded and stored in the memory unit (132), the controller (133) can then use the email messages (103, FIG. 1), for example, to alert designated recipients of conditions in the printing device (130). Alternatively, the controller (133) may upload the email message interface (104, FIG. 1) to the printing device memory unit (132). The controller (133) will then use the email message interface (104, FIG. 1) to access and use the email messages (103, FIG. 1) that remain stored on the memory module (110, FIG. 1).

The printing device (130) also includes a user interface (134) to allow a user or attendant to control operation of the printing device (130). Such a user interface (134) may include, for example, a display device such as a liquid crystal display (LCD) and a keypad, buttons or other device for allowing a user to input or select data, such as selecting menu items or responding to queries. Alternatively, the user interface (134) may include a touch screen that both displays data and receives user input. The email addresses to which the messages (103, FIG. 1) are sent may be provided in a similar manner to the printing device via the memory on the consumable or may be programmed into the printing device through the user interface (134). Programming these email addresses through a device user interface could be done directly at the device (such as through the user interface (134) or remotely using a printer driver or other tool, such as WebJetAdmin available from the Hewlett-Packard Co., that resides on a computer in communication with the printing device (130).

In some embodiments, the email messages (103, FIG. 1) may contain printing device instructions and/or information. The email messages (103) may also contain blank fields into which information can be inserted. These entry fields can be filled in, for example, with printing device information available to the controller (133), perhaps stored in printing device memory (132). The printing device information can be inserted automatically or manually into entry fields in the email message. Such printing device information could include the printer serial number, IP address, physical location, or other printer identifier. The inserted printing device information may also relate to the current state of the printing device, such as the quantity of a consumable remaining. The inserted data may also represent device usage data and error histories, such as age counts for various paper sizes and types as well as failure counts for different types of jams. In one embodiment, the email messages (103) could contain reordering information for the consumable such as shipping addresses, account numbers, etc. Such an email message may be automatically sent to the reseller or distributor of the printing device consumables, whereupon automatic processing and delivery of new printing device consumables would take place.

In some embodiments, the printing device (130) may automatically upload, store or use programming or data from an interfaced memory module (110). Alternatively, the user interface (134) can allow the operator of the printing device (130) to control whether the printing device (130) uploads, stores, or uses any of the programming or data available from an interfaced memory module (110) on a consumable (120).

Once the email message elements (102) are available to the printing device (130), either stored in the printing device memory (132) or available directly from an interfaced memory module (110), the email message elements (102) can be used in conjunction with the email engine (135) to send appropriate email messages to one or more recipients indicating conditions relating to the printing device (130). Such emails may be sent in response to trigger events. For example, an occurrence of low toner or a paper jam, etc., may be included as one of a variety of "trigger events" about which a user or attendant would be notified by email. The occurrence of a paper jam is another possible trigger event for which a user might want to receive an email notice. Depletion of the supply of paper or other print medium is another possible trigger event. Any event of which a printer user wishes to be notified may be a trigger event.

In one embodiment, the email message elements (102) may include a list of possible trigger events so that a user can select a trigger event and corresponding email message for which an email notification should be generated. The user may do so through the user interface (134) of the printing device (130) while the email message elements (102) are accessible to the controller (133).

For some users, however, this may be too complicated. Consequently, the controller (133) may be programmed to automatically access the email message elements (102) and pair email messages (103, FIG. 1) included in the email message elements (102) to particular trigger events from a list of "default" trigger events. The list of default trigger events may be stored in the printing device (130) or may be provided on the memory module (110). Alternatively, the list of trigger events might be dynamically set based on the state of the printing device into which the consumables were installed. For example, if frequent failures were observed in a particular area or function, the trigger list could be modified to reflect such problem areas or functions. The controller (133) may also automatically pair each trigger event and associated email message(s) with one or more corresponding alert email addresses.

While this process is automatic, the user interface (134) can be used to allow the user to review and make changes, if desired, in the resulting alert scheme. For example, the user may then deselect or disassociate, if desired, any of the default trigger events, paired email addresses and/or corresponding alert messages. The user can also, with the user interface (134) make other associations between a trigger event, email message and alert email address.

Once the printing device (130) has associated email messages provided by the memory module (110) with appropriate trigger events and corresponding alert email addresses, the controller (133) monitors the printing device (130) operation for the occurrence of any of the designated trigger events. The printing device controller (133) identifies trigger events when they occur and uses the email message elements (102) stored on the memory module (110) or in printing device memory (132) to identify the corresponding email message(s) (103, FIG. 1) to be sent in response to the occurrence of the trigger event.

The email notification generated by the printing device (130) with the email message elements (102) may be sent to the immediate user of the printing device (130), a designated printing device attendant or even a third-party supplier responsible for maintenance of the printing device. For example, a printing device may be provided to an enterprise on a lease basis, such as a Cost-per-Page (CPP) contract in which the user is charged for each printed page rather than for the printing device itself. Under such a lease, the owner of the printing device, rather than the user or lessee of the printing device, may be responsible for maintaining the printing device, including service, parts, toner, etc., for the length of the contract. Therefore, when a printing device under CPP contract or similar lease experiences a trigger condition, such as having a low toner supply, an email notifying the owner of the printing device may be sent. The printing device can then be serviced as needed without the user, i.e., the party leasing the printing device, being involved or even aware of the need for service to the printing device and the consequent service provided.

Figure 4:
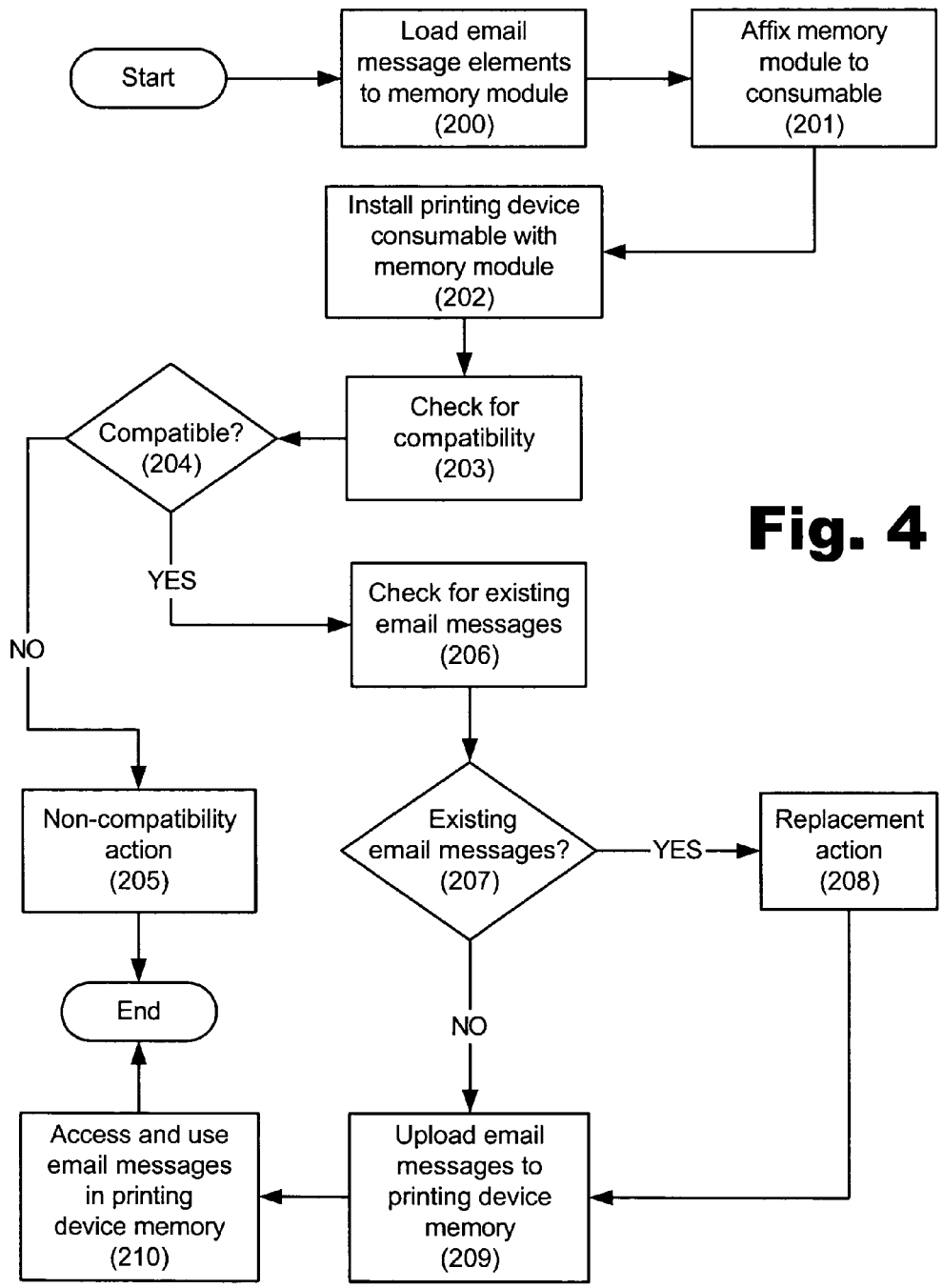
FIG. 4 is a flowchart illustrating a method of providing email messages for a printing device according to one embodiment of the present invention.

FIG. 4 is a flowchart illustrating a method of providing email messages for a printing device. As shown in FIG. 4, email message elements are loaded on a memory module (step 200). The memory module may be any memory device capable of storing computer-readable instructions, including, but not limited to, Flash memory, battery-backed random access memory (RAM), etc. The memory module is then attached or affixed to a consumable that will be used by or in a printing device (step 201).

After a printing device consumable, e.g., a toner cartridge, print media stack, etc., with the attached memory module has been installed in a printing device (step 202), a check for compatibility may be performed (step 203). This compatibility check may include determining if the stored email messages are complete. This compatibility check may also include sending a test message to listed e-mail messages to determine the validity of those email messages.

If there is an incompatibility discovered, for example, one or more email messages are invalid or incomplete (determination 204), a non-compatibility action is carried out (step 205). For example, a non-compatibility action may include a notice appearing on a computer monitor or a display device of a user interface on the printing device indicating that the email message elements are invalid, incomplete or otherwise incompatible with the printing device. Additionally, information on how to fix the compatibility problem may be displayed along with the indication of incompatibility.

If the email message elements are valid and complete (determination 204), a check for existing email messages in the printing device memory may be performed (step 206). If other email messages already exist in the printing device memory (determination 207), a replacement action may be performed (step 208). For example, a replacement action (step 208) includes allowing a user to indicate through the user interface of the printing device whether to overwrite the existing email messages in the memory of the printing device with the new email messages available from the memory module on the consumable or whether to merely add the new messages from the memory module to those already stored in the printing device (step 209).

The user may be given the option to deal selectively with each individual new message from the memory module. For example, the user may decide for each new message on the memory module whether that new message will replace an existing message, be added to the list of existing messages or be discarded by the user (step 208).

Whether replacing or adding email messages or replacing an email message interface, a password or other confirmation of authority may be required to initiate the replacement action (step 208). As part of the replacement action (step 208), or if no email messages presently exist on a printing device (determination 207), the email messages included with the printing device consumable may be uploaded to printing device memory (step 209). After the new email messages have been uploaded or installed, the email messages may be accessed in the printing device memory (step 210) and used as described above to generate email alerts regarding the conditions of the printing device.

Figure 5:
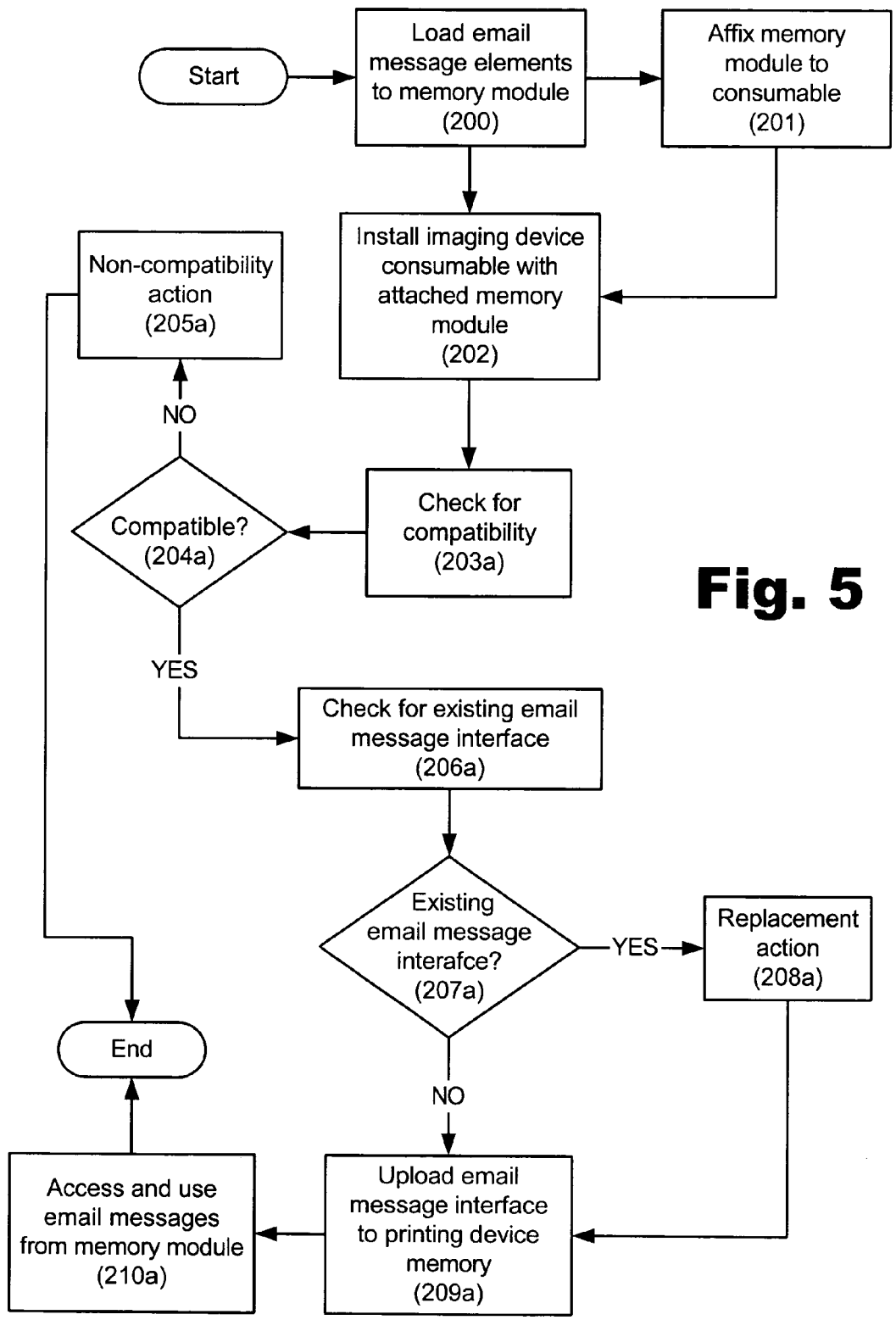
FIG. 5 is a flowchart illustrating a method of providing email messages for a printing device according to an alternative embodiment of the present invention.

FIG. 5 is a flowchart illustrating another method of providing email messages for a printing device. FIG. 5 is similar to FIG. 4. As shown in FIG. 5, email message elements are loaded on a memory module (step 200). The memory module may be any memory device capable of storing computer-readable instructions. The memory module is then attached or affixed to a consumable that will be used by or in a printing device (step 201).

After a printing device consumable with the attached memory module has been installed in a printing device (step 202), a check for hardware/software compatibility may be performed (step 203a). In particular, this will include determining if an email message interface (104, FIG. 1) on the memory module is compatible with the printing device's email engine (135, FIG. 3) and/or other hardware/software of the host printing device. If any incompatibility is discovered (determination 204a), a non-compatibility action is carried out (step 205a). For example, a non-compatibility action may comprise a notice indicating that the email message interface is incompatible with the printing device. Additionally, information that may be used to fix the compatibility problem may be displayed along with the indication of incompatibility.

If the email message interface is compatible with the printing device (determination 204a), a check for an existing email message interface may be performed (step 206a). If another email message interface already exists on the printing device (determination 207a), a replacement action may be performed (step 208a). A replacement action (step 208a) may comprise determining whether to upload the email message interface on the memory module to replace the previously stored email message interface. This may include determining if an email message interface available on the memory module is a later version than that stored in the printing device memory.

As with the replacement of email messages described above, user input through the user interface of the printing device may be requested before an existing email message interface is replaced by the email message interface available on a memory module on a consumable. Additionally, a password or other confirmation of authority may be required to initiate replacement of existing email message elements in the printing device.

As a result of the replacement action (step 208a), or if no email message interface presently exists on a printing device (determination 207a), the email message interface is uploaded to the printing device memory from the memory module on the consumable (step 209a). As illustrated above in FIG. 1, the email message interface (104) is a component of the email message elements (102) that allows a printing device to use the email messages while the messages remain on the memory module on the consumable and are not loaded or installed in the memory unit of the printing device.

After the email message interface has been stored on the printing device, the email message interface can be used to access and use the email messages on the memory module (step 210a), without having to copy the email messages into the memory of the printing device. As described above, the email messages are used to send email alerts to designated recipients based on printing device conditions.

The process of FIG. 5 differs from the process of FIG. 4 in that the process of FIG. 4 stores the email messages from the memory module in printing device memory, while the process of FIG. 5 does not. Instead, the process of FIG. 5 accesses and uses the email messages on the memory module (step 210a) using the email message interface whenever the email messages are needed.

Figure 6:
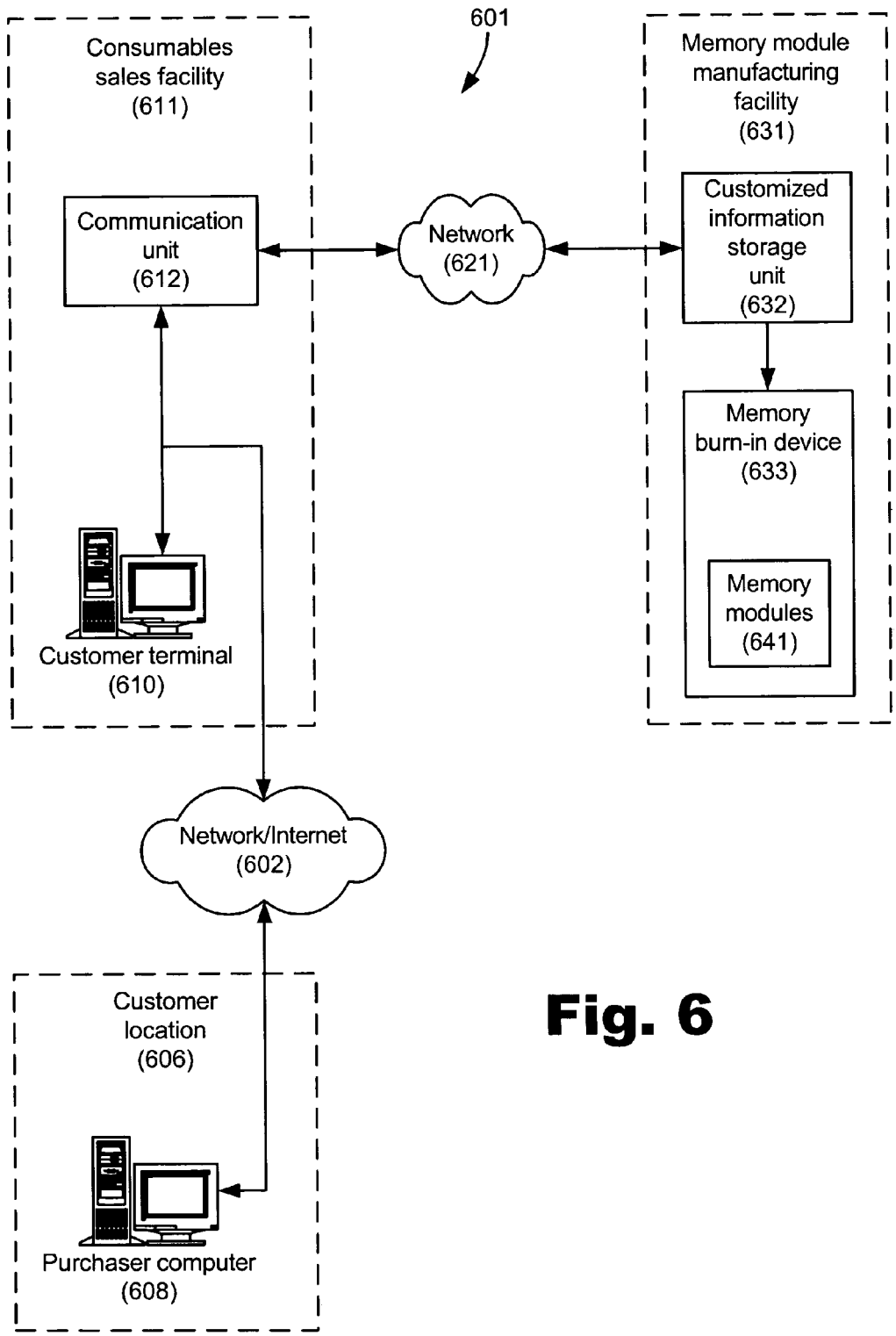
FIG. 6 is a block diagram illustrating a system for customizing email message elements on memory modules according to one embodiment of the present invention.

FIG. 6 is a block diagram illustrating a system for customizing email message elements on memory modules. As indicated above, a memory module (110) may include email messages, an email message interface, and computer-readable instructions which pair the email messages available on the memory module with trigger events on the printing device.

Different purchasers of a printing device consumable may want different customizable email messages to be available for different trigger events and will likely want those messages addressed to particular recipients within the purchaser's organization or at a contactor serving the purchaser. Thus, FIG. 6 illustrates a system with which a consumable purchaser can have customized email messages (103, FIG. 1) stored on a memory module (110, FIG. 2) that is affixed to the consumable (120, FIG. 2) being purchased. The system of FIG. 6 can also allow for the other email message elements (102, FIG. 1) on the memory module to be customized or a version of the email message interface (104, FIG. 1) to be selected so as to be compatible with the printing device of the purchaser.

As shown in FIG. 6, the system (601) may include components at up to three different locations: a customer location (606), a consumables sales facility (611) and a memory module manufacturing facility (631). There are a number of possible scenarios for a purchaser who wishes to buy printing device consumables with customized memory modules bearing email messages.

For example, a purchaser may visit a sales facility (611). The sales facility (611) may include a customer terminal (610) into which a purchaser can enter the information to customize a memory module on a purchased consumable. For example, the purchaser, using the customer terminal (610), can enter the email messages (103, FIG. 1), select or designate trigger events, etc. Alternatively, the purchaser could telephone, fax, email or otherwise transmit the information to the sales facility (611), whereupon sales facility personnel would enter the information into the terminal (610).

The information is then sent to a communication unit (612). The communication unit (612) transfers the information for customizing the memory module to a memory module manufacturing facility (631). The communication unit (612) may communicate with the manufacturing facility (631) through a network (621). The network (621) may be a private or public network, and may include the Internet. The sales facility (611) and the manufacturing facility (631) may be at the same location or may be in different cities or even on different continents.

The information for customizing the memory module is stored in a data storage unit (632) until it is time to prepare the customized memory module. The information is then read into the system that forms the customized memory module, for example, a memory burn-in device (633). The burn-in device (633) then creates the customized memory module (641) desired by the purchaser by loading the desired data onto the memory module (641). The customized memory module (641) is then affixed to the ordered consumable and shipped to the purchaser.

In a different scenario, the purchaser need not visit the sales facility (611) to place an order for a customized memory module on a consumable. Rather, the purchaser can use a computer (608) at the customer's location (606). For example, the purchaser, using the computer (608) can contact the communication unit (612) electronically. In one embodiment, the communication unit (612) includes a web server that the purchaser accesses through the Internet (602). The purchaser then inputs the information for customizing the memory module. This information is then transmitted to the communication unit (612), which may treat the information in the same manner as if entered through the customer terminal (610) at the sales facility (611). The information is then loaded to a customized memory module (641) as described above.

The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

What is claimed is:

1. A method of providing email messages to a printing device, said method comprising:
attaching a memory module storing said email messages to a printing device consumable; uploading said email messages from the memory module of the printing device consumable to the printing device; and transmitting said email messages from the printing device to a recipient to indicate a condition relating to the printing device.

2. The method of claim 1, further comprising:
installing said printing device consumable in said printing device; and
interfacing said printing device and said memory module.

3. The method of claim 2, further comprising uploading an email message interface from said memory module to a memory of said printing device.

4. The method of claim 3, further comprising executing said email message interface with a controller of said printing device.

5. The method of claim 4, further comprising using said email messages on said memory module through said email message interface.

6. The method of claim 1, wherein said printing device consumable comprises a toner cartridge.

7. The method of claim 1, wherein said email messages comprise fields for containing printing device information.

8. The method of claim 7, wherein said printing device information comprises an identification of said printing device.

9. The method of claim 7, wherein said printing device information comprises a quantification of a remaining amount of a consumable.

10. The method of claim 7, wherein said email message comprises an order for additional consumables sent to a provider of said consumables.

11. A consumable for use with a printing device, said consumable comprising:
a printing device consumable;
a memory module attached to said printing device consumable; and email messages stored on said memory module prior to attachment of said memory module to said printing device consumable, wherein the email messages stored on said memory module are for uploading from said memory module to the printing device, and the uploaded email messages are for transmission from the printing device to a recipient to indicate a condition relating to the printing device.

12. The consumable of claim 11, further comprising a wireless interface for said memory module for interfacing and communicating with the printing device.

13. The consumable of claim 12, wherein said wireless interface comprises a radio frequency interface.

14. The consumable of claim 12, wherein said wireless interface comprises an infrared interface.

15. The consumable of claim 11, further comprising a wired interface for said memory module for interfacing and communicating with the printing device.

16. The consumable of claim 11, further comprising an email message interface stored on said memory module which, when uploaded to the printing device, allows access and use of said email messages on said memory module.

17. A printing device comprising:
 a printing device controller with an email engine for using email messages provided by a memory module attached to a printing device consumable, wherein the email messages are stored on the memory module prior to attachment of the memory module to the printing device consumable;
 a printing device memory storing said email engine; and
 a printing device interface disposed and configured to interface and communicate with said memory module attached to the printing device consumable supplied to said printing device;
 wherein said printing device controller is configured to access email messages on said memory module attached to said printing device consumable, load said email messages into said printing device memory and selectively transmit said email messages using said email engine to indicate a condition relating to the printing device.

18. The printing device of claim 17, wherein said printing device interface comprises a wireless interface.

19. The printing device of claim 18, wherein said wireless interface comprises a radio frequency interface.

20. The printing device of claim 18, wherein said wireless interface comprises an infrared interface.

21. The printing device of claim 17, wherein said printing device interface comprises a wired interface.

22. The printing device of claim 17, further comprising a user interface for controlling said printing device.

* * * * *